US012739301B2

(12) United States Patent
Shen et al.

(10) Patent No.: US 12,739,301 B2
(45) Date of Patent: Sep. 15, 2026

(54) DATA PROCESSING METHOD AND APPARATUS, COMPUTER DEVICE, AND COMPUTER-READABLE STORAGE MEDIUM

(71) Applicant: HUAWEI TECHNOLOGIES CO., LTD., Shenzhen (CN)

(72) Inventors: Shu Shen, Dongguan (CN); Qiqing Wu, Shenzhen (CN); Jian Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/590,120

(22) Filed: Feb. 28, 2024

(65) Prior Publication Data

US 2024/0205292 A1 Jun. 20, 2024

Related U.S. Application Data

(63) Continuation of application No. PCT/CN2022/086063, filed on Apr. 11, 2022.

(30) Foreign Application Priority Data

Aug. 31, 2021 (CN) ......................... 202111010047.2

(51) Int. Cl.
*H04L 12/24* (2006.01)
*H04L 41/0803* (2022.01)
*H04L 67/1097* (2022.01)

(52) U.S. Cl.
CPC ................................ *H04L 67/1097* (2013.01)

(58) Field of Classification Search
CPC . H04L 67/1097; H04L 67/288; H04L 67/563; G06F 9/50; G06F 16/13
(Continued)

(56) References Cited

U.S. PATENT DOCUMENTS 7,191,333 B1 * 3/2007 Maddury .............. H04L 9/3247 713/180
9,729,581 B1 * 8/2017 Skene ..................... H04L 67/10
(Continued)

FOREIGN PATENT DOCUMENTS

CN 106130920 A 11/2016
CN 110233875 A * 9/2019 ......... H04L 67/1044
(Continued)

OTHER PUBLICATIONS

Wang et al., "Design and implementation of enterprise network disk based on multi-cloud servers," Journal of Integration Technology, Mar. 2019, 14 pages (with English machine translation).
(Continued)

*Primary Examiner* — Ario Etienne
*Assistant Examiner* — Elizabeth Kassa
(74) *Attorney, Agent, or Firm* — Fish & Richardson P.C.

(57) ABSTRACT

Example data processing methods and apparatuses, example computer devices, and example computer-readable storage medium are provided. An example data processing method is applied to a storage system in which storage and computing are decoupled. The storage system includes a computing cluster and a storage cluster. The example method is performed by a computing node in the computing cluster. The example method includes receiving a data processing request, where the data processing request indicates to process a file. A first gateway device is determined from a plurality of gateway devices in the storage cluster. The data processing request is sent to the first gateway device, where the first gateway device forwards the data processing request to a storage node in the storage cluster to complete the processing of the file.

20 Claims, 6 Drawing Sheets

(58) Field of Classification Search
USPC .................................................. 709/204, 217
See application file for complete search history.

(56) References Cited

U.S. PATENT DOCUMENTS

| | | | | |
|---|---|---|---|---|
| 11,099,099 | B1 * | 8/2021 | Wei | G01M 3/3272 |
| 2013/0185536 | A1 * | 7/2013 | Mari | G06F 12/08 711/216 |
| 2014/0149590 | A1 * | 5/2014 | Mallipeddi | G06F 9/5061 709/226 |
| 2014/0229696 | A1 * | 8/2014 | Feng | G06F 3/0647 711/162 |
| 2015/0063360 | A1 * | 3/2015 | Thakkar | H04L 49/70 370/400 |
| 2015/0063364 | A1 * | 3/2015 | Thakkar | H04L 45/586 370/401 |
| 2015/0263899 | A1 * | 9/2015 | Tubaltsev | H04L 45/033 370/254 |
| 2015/0263946 | A1 * | 9/2015 | Tubaltsev | H04L 45/586 370/392 |
| 2017/0017662 | A1 * | 1/2017 | Hayes | G06F 3/0679 |
| 2018/0227977 | A1 * | 8/2018 | Jin | H04W 76/12 |
| 2020/0112474 | A1 * | 4/2020 | Seong | H04L 41/042 |
| 2021/0216249 | A1 * | 7/2021 | Hayes | G06F 3/0679 |
| 2021/0258380 | A1 * | 8/2021 | Sunshine | H04L 67/02 |
| 2021/0267014 | A1 * | 8/2021 | Kakinada | H04W 48/17 |
| 2021/0410116 | A1 * | 12/2021 | Zhang | H04W 24/02 |
| 2022/0164258 | A1 * | 5/2022 | Puvvada | G06F 11/3051 |
| 2022/0237298 | A1 * | 7/2022 | Lambert | G06F 21/575 |

FOREIGN PATENT DOCUMENTS

| | | | | |
|---|---|---|---|---|
| CN | 111385359 A | | 7/2020 | |
| CN | 112929424 A | | 6/2021 | |
| WO | WO-2020030000 A1 | * | 2/2020 | G06F 11/1464 |

OTHER PUBLICATIONS

Yang et al., "Design and implementation of load balancing based on Ceph object storage cluster," Computer system application, vol. 25, No. 4, 2016, 4 pages (with English machine translation).

International Search Report and Written Opinion in International Appln. No. PCT/CN2022/086063, mailed on Jun. 22, 2022, 18 pages (with English translation).

Extended European Search Report in European Appln. No. 22862631.3, mailed on Nov. 8, 2024, 9 pages.

* cited by examiner

DATA PROCESSING METHOD AND APPARATUS, COMPUTER DEVICE, AND COMPUTER-READABLE STORAGE MEDIUM

CROSS-REFERENCE TO RELATED APPLICATIONS

This application is a continuation of International Application No. PCT/CN2022/086063, filed on Apr. 11, 2022, which claims priority to Chinese Patent Application No. 202111010047.2, filed on Aug. 31, 2021. The disclosures of the aforementioned applications are hereby incorporated by reference in their entireties.

TECHNICAL FIELD

This application relates to the field of storage technologies, and in particular, to a data processing method and apparatus, a computer device, and a computer-readable storage medium.

BACKGROUND

With the development and application of cloud computing technologies, to meet elastic expansion and efficient storage of storage and computing, a storage system in a decoupled storage and computing architecture is evolved from a storage system in a coupled storage and computing architecture. For example, a storage system in which storage and computing are decoupled includes a computing cluster, a load balancing cluster, and a storage cluster. The computing cluster accesses the storage cluster through a data forwarding cluster.

Currently, a data processing process in a storage system in which storage and computing are decoupled may be as follows: A computing node in a computing cluster sends a data processing request to a load balancing device in a data forwarding cluster. The load balancing device selects one gateway device from a plurality of gateway devices in a storage cluster by using a load balancing solution, and forwards the data processing request to the selected gateway device. The gateway device sends the data processing request to a storage node in the storage cluster. The storage node processes the data processing request, for example, reads data or stores data. The load balancing device in the data forwarding cluster may be a load balancer, such as an F5 load balancer provided by an F5 network company or a load balancer Nginx, or may be a load balancer in which a Linux virtual server (LVS) is deployed.

However, when a storage system in which storage and computing are decoupled is large, to implement load balancing, more than one load balancing device may be deployed in a load balancing cluster, and the load balancing device is expensive. As a result, costs of constructing the storage system in which storage and computing are decoupled continuously increase. Therefore, how to provide a low-cost storage system becomes an urgent technical problem to be resolved.

SUMMARY

This application provides a data processing method and apparatus, a computer device, and a storage medium, to reduce costs of constructing a storage system in which storage and computing are decoupled. The technical solution is as follows:

According to a first aspect, a data processing method is provided. The method is applied to a storage system in which storage and computing are decoupled, the storage system includes a computing cluster and a storage cluster, and the method is performed by a computing node in the computing cluster. The method includes: receiving a data processing request, where the data processing request indicates to process a file; determining a first gateway device from a plurality of gateway devices in the storage cluster; and sending the data processing request to the first gateway device, where the first gateway device forwards the data processing request to a storage node in the storage cluster to complete the processing of the file.

In the method, a computing node in a computing cluster implements a function of a load balancer, so that the computing node may select a gateway device from a plurality of gateway devices in a storage cluster to send a data processing request. In a data processing process, the computing node does not need to select the gateway device for the data processing request by using a load balancing cluster. Therefore, when a storage system in which storage and computing are decoupled is constructed, the load balancing cluster does not need to be deployed. In this way, costs of constructing the storage system in which storage and computing are decoupled are reduced.

In a possible implementation, correspondences between the plurality of gateway devices and indexes are recorded in the computing node, and each gateway device in the plurality of gateway devices corresponds to one index. The determining a first gateway device from a plurality of gateway devices in the storage cluster includes: performing hash calculation on an identifier of the file carried in the data processing request, to obtain a hash value of the file; obtaining a target index based on the hash value; and determining, based on the correspondences between the plurality of gateway devices and the indexes, a gateway device that is in the plurality of gateway devices and that corresponds to the target index as the first gateway device.

In a possible implementation, the correspondences between the plurality of gateway devices and the indexes include an identifier of each gateway device in the plurality of gateway devices and an index corresponding to each gateway device in the plurality of gateway devices, and the identifier of each gateway device includes an internet protocol IP address of each gateway device.

In a possible implementation, the target index is a remainder of the hash value and a quantity of the plurality of gateway devices.

In a possible implementation, the determining a first gateway device from a plurality of gateway devices in the storage cluster includes:

randomly selecting any one gateway device from the plurality of gateway devices as the first gateway device.

In a possible implementation, before the determining a first gateway device from a plurality of gateway devices in the storage cluster, the method further includes:

obtaining, from a monitoring node in the storage cluster, a status of each gateway device in the storage cluster, where the status includes any one of an idle state, a busy state, or a faulty state; and determining, based on the status of each gateway device in the storage cluster, the plurality of gateway devices in the idle state.

In a possible implementation, the sending the data processing request to the first gateway device, where the first gateway device forwards the data processing request to a storage node in the storage cluster to complete the processing of the file includes:

if the first gateway device is in a busy state or a faulty state, determining, based on recorded statuses of the plurality of gateway devices, a second gateway device from the plurality of gateway devices; and sending the data processing request to the second gateway device, where the second gateway device forwards the data processing request to the storage node in the storage cluster to complete the processing of the file, and the second gateway device is any one gateway device that is in the plurality of gateway devices and that is in an idle state.

According to a second aspect, a data processing method is provided. The method is applied to a storage system in which storage and computing are decoupled, the storage system includes a computing cluster and a storage cluster, the method is performed by a gateway device in the storage cluster. The method includes: receiving a data processing request of a computing node in the computing cluster, where the data processing request indicates to process a file, and the gateway device is determined by the computing node from a plurality of gateway devices in the storage cluster; and sending the data processing request to a storage node in the storage cluster, where the storage node processes the file based on the data processing request.

In a possible implementation, before the receiving a data processing request of a computing node in the computing cluster, the method further includes: sending a status of the gateway device to a monitoring node in the storage cluster, where the status includes any one of an idle state, a busy state, or a faulty state.

In a possible implementation, the storage cluster includes M resource pools, each resource pool includes one piece of primary gateway software and N pieces of secondary gateway software, and the gateway device includes primary gateway software in one resource pool. The primary gateway software in the gateway device receives and sends the data processing request, where both M and N are integers greater than or equal to 1.

Before the receiving a data processing request of a computing node in the computing cluster, the method further includes: If the primary gateway software in the gateway device is in the faulty state or the busy state, a gateway monitoring module in the gateway device runs one piece of secondary gateway software in the resource pool in which the primary gateway software is located, and the run secondary gateway software receives and sends the data processing request.

In a possible implementation, that a gateway monitoring module in the gateway device runs one piece of secondary gateway software in the resource pool in which the primary gateway software is located includes: If the gateway device further includes K pieces of secondary gateway software in the resource pool in which the primary gateway software is located, the gateway monitoring module runs any one piece of secondary gateway software in the K pieces of secondary gateway software, where K is an integer greater than or equal to 1 and less than or equal to N. Alternatively, if the one piece of secondary gateway software in the resource pool in which the primary gateway software is located is deployed in a secondary gateway device, the gateway monitoring module sends an address update request to the secondary gateway device, where the address update request indicates the secondary gateway device to modify an IP address to an IP address of the gateway device, and run secondary software in the secondary gateway device.

According to a third aspect, a storage system in which storage and computing are decoupled is provided. The storage system includes a computing cluster and a storage cluster, and the computing cluster includes a computing node.

The computing node is configured to: receive a data processing request; determine a first gateway device from a plurality of gateway devices in the storage cluster; and send the data processing request to the first gateway device, where the data processing request indicates to process a file.

The first gateway device is configured to: receive the data processing request of the computing node in the computing cluster; and send the data processing request to a storage node in the storage cluster, where the storage node processes the file based on the data processing request.

In a possible implementation, the computing node is further configured to:

perform hash calculation on an identifier of the file carried in the data processing request, to obtain a hash value of the file;

obtain a target index based on the hash value; and determine, based on correspondences between the plurality of gateway devices and indexes, a gateway device that is in the plurality of gateway devices and that corresponds to the target index as the first gateway device.

In a possible implementation, the correspondences between the plurality of gateway devices and the indexes include an identifier of each gateway device in the plurality of gateway devices and an index corresponding to each gateway device in the plurality of gateway devices, and the identifier of each gateway device includes an internet protocol IP address of each gateway device.

In a possible implementation, the target index is a remainder of the hash value and a quantity of the plurality of gateway devices.

In a possible implementation, the computing node is further configured to randomly select any one gateway device from the plurality of gateway devices as the first gateway device.

In a possible implementation, the computing node is further configured to: obtain, from a monitoring node in the storage cluster, a status of each gateway device in the storage cluster, where the status includes any one of an idle state, a busy state, or a faulty state; and determine, based on the status of each gateway device in the storage cluster, the plurality of gateway devices in the idle state.

In a possible implementation, the computing node is further configured to: if the first gateway device is in the busy state or the faulty state, determine, based on recorded statuses of the plurality of gateway devices, a second gateway device from the plurality of gateway devices; and send the data processing request to the second gateway device, where the second gateway device is any one gateway device that is in the plurality of gateway devices and that is in the idle state. The second gateway device is configured to: receive the data processing request of the computing node in the computing cluster; and send the data processing request to the storage node in the storage cluster, where the storage node processes the file based on the data processing request.

In a possible implementation, the first gateway device is further configured to send a status of the first gateway device to the monitoring node in the storage cluster, where the status includes any one of the idle state, the busy state, or the faulty state.

In a possible implementation, the storage cluster includes M resource pools, each resource pool includes one piece of primary gateway software and N pieces of secondary gateway software, and the gateway device includes primary gateway software in one resource pool. The primary gateway software in the first gateway device receives and sends the data processing request, where both M and N are integers greater than or equal to 1. A gateway monitoring module in the first gateway device is configured to: if the primary gateway software in the first gateway device is in the faulty state or the busy state, run one piece of secondary gateway software in the resource pool in which the primary gateway software is located, and the run secondary gateway software receives and sends the data processing request.

In a possible implementation, the gateway monitoring module is configured to: if the first gateway device further includes K pieces of secondary gateway software in the resource pool in which the primary gateway software is located, run any one piece of secondary gateway software in the K pieces of secondary gateway software, where K is an integer greater than or equal to 1 and less than or equal to N. Alternatively, if the one piece of secondary gateway software in the resource pool in which the primary gateway software is located is deployed in a secondary gateway device, the monitoring module sends an address update request to the secondary gateway device, where the address update request indicates the secondary gateway device to modify an IP address to an IP address of the gateway device, and run secondary software in the secondary gateway device.

According to a fourth aspect, a data processing apparatus is provided, configured to perform the foregoing data processing method. Specifically, the data processing apparatus includes a function module configured to perform the data processing method provided in any one of the first aspect or the optional manners of the first aspect.

According to a fifth aspect, a data processing apparatus is provided, configured to perform the foregoing data processing method. Specifically, the data processing apparatus includes a function module configured to perform the data processing method provided in any one of the second aspect or the optional manners of the second aspect.

According to a sixth aspect, a computer device is provided. The computer device includes a processor, and the processor is configured to execute program code, to enable the computer device to perform operations performed to implement the foregoing data processing method. Specifically, the computer device is enabled to perform an operation performed to implement the data processing method provided in any one of the first aspect or the optional manners of the first aspect.

According to a seventh aspect, a computer device is provided. The computer device includes a processor, and the processor is configured to execute program code, to enable the computer device to perform operations performed to implement the foregoing data processing method. Specifically, the computer device is enabled to perform an operation performed to implement the data processing method provided in any one of the second aspect or the optional manners of the second aspect.

According to an eighth aspect, a computer-readable storage medium is provided. The storage medium stores at least one piece of program code, and the program code is read by a processor, to enable a computer device to perform an operation performed in the foregoing data processing method. Specifically, the computer device is enabled to perform an operation performed to implement the data processing method provided in any one of the first aspect or the optional manners of the first aspect, or the computer device is enabled to perform an operation performed to implement the data processing method provided in any one of the second aspect or the optional manners of the second aspect.

According to a ninth aspect, a computer program product is provided. The computer program product includes at least one piece of program code, and the program code is stored in a computer-readable storage medium. A processor of a computer device reads the program code from the computer-readable storage medium, and executes the program code, to enable the computer device to perform the method provided in the first aspect or the optional implementations of the first aspect, or enable the computer device to perform the method provided in the second aspect or the optional implementations of the second aspect.

In this application, based on the implementations provided in the foregoing aspects, the implementations may be further combined to provide more implementations.

DESCRIPTION OF EMBODIMENTS

The following further describes implementations of this application in detail with reference to accompanying drawings.

Figure 1:
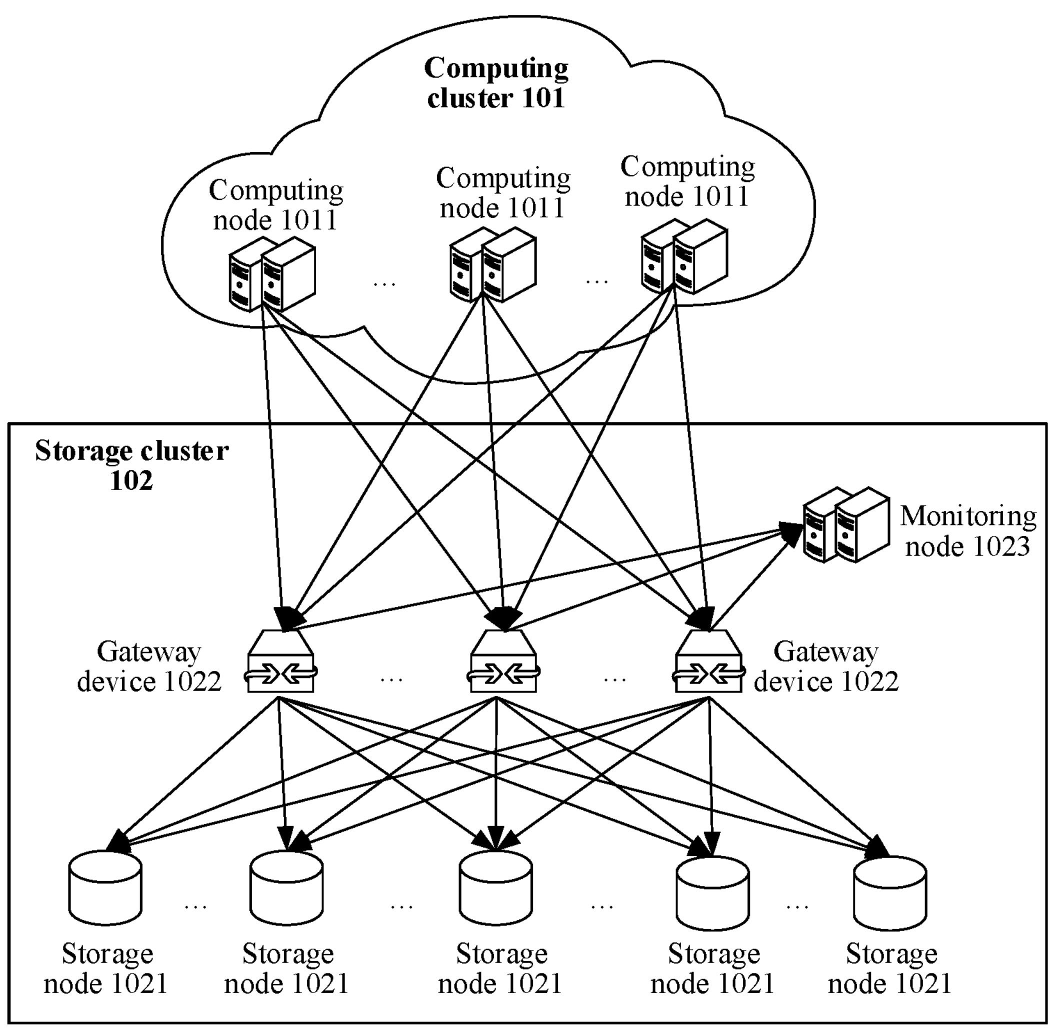
FIG. 1 is a schematic diagram of a storage system in which storage and computing are decoupled according to this application.

FIG. 1 is a schematic diagram of a storage system in which storage and computing are decoupled according to this application. Refer to FIG. 1. A system 100 includes at least one computing cluster 101 and at least one storage cluster 102. Each computing cluster 101 may correspond to one or more storage clusters 102, and one storage cluster 102 may also correspond to one or more computing clusters 101. For ease of understanding, the following embodiment is described by using an example in which one computing cluster 101 can access one storage cluster 102 and one storage cluster 102 can be accessed by one or more computing clusters 101.

Each computing cluster 101 includes a plurality of computing nodes 1011, and each computing node 1011 is configured to provide a data processing service for a user, for example, storing data provided by the user in the storage cluster 102 or reading data from the storage cluster 102 for the user. Each computing node 1011 may include at least one server. Each computing cluster 101 may be configured to deploy a Hadoop database, a database tool Hive, a computing engine Spark, or a distributed database Hbase.

Each storage cluster 102 includes a plurality of storage nodes 1021 and a plurality of gateway devices 1022. Each storage node 1021 is configured to provide a data storage service, a data reading service, and the like. Each storage node 1021 may include at least one server. Each gateway device 1022 has permission to access each storage node 1021 in the storage cluster 102. For example, at least one piece of gateway software is deployed in each gateway device 1022, and each piece of gateway software provides an application programming interface API) for accessing the storage cluster 102, so that the computing cluster 101 can access the storage node 1021 in the storage cluster 102 by using the gateway software in the gateway device 1022. The storage cluster 102 in the system 100 may be any one storage cluster in a Ceph storage cluster or a FusionStorage distributed storage cluster. If the storage cluster 102 is the Ceph storage cluster, the gateway software deployed in the gateway device 1022 is an object storage gateway (Rados gateway, RGW), and the storage node 1021 may be an object storage device (object-based storage device, OSD).

Using interaction between one computing cluster 101 and one storage cluster 102 in the system 100 as an example, the user may submit a data processing request (for example, a read request for reading data or a write request for writing data) to any one computing node 1011 in the computing cluster 101 by using user equipment. The any one computing node 1011 may select one gateway device 1022 from the gateway devices 1022 deployed in the storage cluster 102 to forward the data processing request submitted by the user. For example, the any one computing node 1011 sends, to the selected gateway device 1022, the data processing request submitted by the user, the gateway device 1022 forwards the data processing request to at least one storage node 1021 in the storage cluster 102, and the at least one storage node 1021 processes the data processing request. Because the computing node 1011 in the computing cluster 101 may select the gateway device 1022 in the storage cluster 102 to forward the data processing request submitted by the user, different data processing requests of a same computing node 1011 may be sent to different gateway devices 1022 in the storage cluster 102. In this way, load balancing of the storage cluster 102 can be ensured when a plurality of concurrent data processing requests are processed. Therefore, a load balancing cluster does not need to be deployed between the storage cluster 102 and the computing cluster 101, so that costs of constructing the storage system 100 in which storage and computing are decoupled are reduced.

In a possible implementation, each storage cluster 102 further includes a monitoring node 1023. The monitoring node 1023 is configured to collect a status of each gateway device 1022 in the storage cluster 102. A status of one gateway device 1022 includes an idle state, a busy state, or a faulty state. The idle state and the busy state are non-faulty states of the gateway device 1022, and the gateway device 1022 can work normally in the non-faulty state. The computing node 1011 in the computing cluster 101 may obtain, from the monitoring node 1023, the status of each gateway device 1022 in the storage cluster 102. When selecting the gateway device 1022 for the data processing request, the computing node 1011 may preferentially select a gateway device 1022 in the idle state. Selecting the gateway device 1022 in the idle state may ensure load balancing on the gateway device 1022, so that the data processing request does not need to wait for forwarding in a queue on the gateway device 1022 in the idle state.

Figure 2:
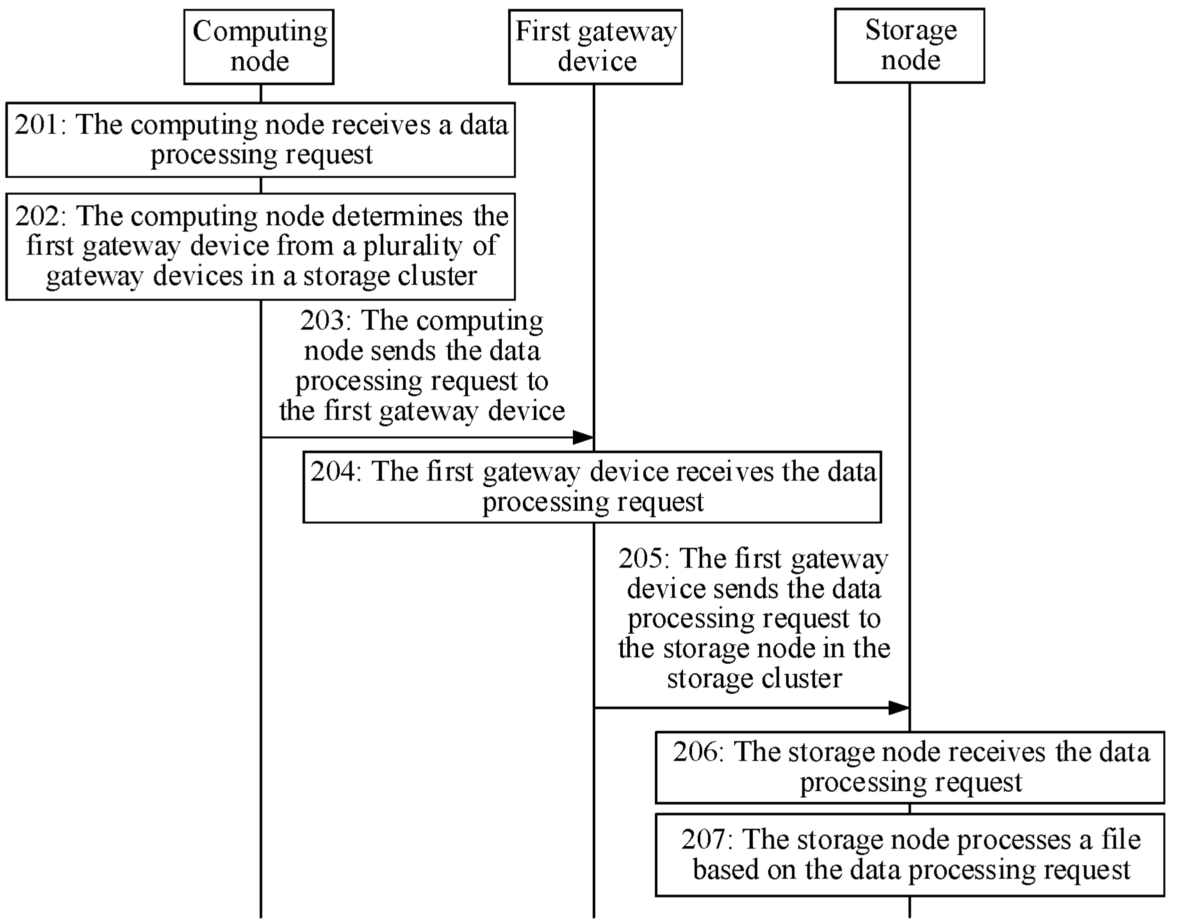
FIG. 2 is a flowchart of a data processing method according to this application.

To further describe a process in which a computing node selects a gateway device for a data processing request, refer to a flowchart of a data processing method according to this application shown in FIG. 2. The method is applied to a storage system in which storage and computing are decoupled. The storage system in which storage and computing are decoupled may be the storage system shown in FIG. 1.

Step 201: A computing node receives a data processing request, where the data processing request indicates to process a file.

The computing node is any one computing node in any one computing cluster in the storage system in which storage and computing are decoupled. The any one computing node in the any one computing cluster has a function of selecting a gateway device and a function of accessing a storage cluster by using the selected gateway device. For example, any one node device can select one gateway device from a plurality of gateway devices in the storage cluster to send the data processing request, and then the selected gateway device forwards the data processing request to a storage node in the storage cluster to complete the processing of the file. For ease of understanding, the following embodiment is described by using an example in which one computing node in any one computing cluster selects a gateway device to access one storage cluster.

The file is a to-be-processed file specified by a user. The data processing request may be a read request or a write request. If the data processing request is the read request, the data processing request indicates to read the file. If the data processing request is the write request, the data processing request indicates to write the file into the storage cluster in the storage system, namely, to store the file.

In a possible implementation, the data processing request carries an identifier of the file, and the identifier of the file uniquely indicates the file, and may be a name of the file. If the data processing request is the write request, the data processing request further carries the file.

In a possible implementation, the user submits a task to the computing node by using user equipment; or the user may submit a task on the computing node, and the computing node decomposes the task submitted by the user into a plurality of data processing requests. For example, the computing node receives a task submitted by the user, and processes the task. In a process of processing the task, the computing node needs to process a plurality of files related to the task. In this case, the computing node generates one data processing request separately based on each file in the plurality of files, and each data processing request indicates to process one file in the plurality of files. Then, the computing node uses any one data processing request in the plurality of data processing requests as a to-be-processed data processing request, and each data processing request in the plurality of data processing requests is processed by using the process shown in FIG. 2.

The user equipment has other names such as a terminal, a terminal station, a user terminal, a user apparatus, an access apparatus, a subscriber station, a subscriber unit, a mobile station, a user agent, a user kit, a portable terminal, a laptop terminal, and a desktop terminal. For example, the user equipment may be a mobile phone, a notebook computer, a tablet computer, a desktop computer, a smart television, a smart wearable device, a computer, an artificial intelligence (AI) product, a smart car, a smart instrument, an internet of things (IoT) terminal, or the like.

Step 202: The computing node determines a first gateway device from the plurality of gateway devices in the storage cluster.

The first gateway device is a gateway device that is selected by the computing node from the plurality of gateway devices and that is used to forward the data processing request.

A manner in which the computing node determines the first gateway device from the plurality of gateway devices includes either the following manner A or B.

Manner A: The computing node selects the first gateway device through hash calculation.

Correspondences between the plurality of gateway devices and indexes are recorded in the computing node, and each gateway device in the plurality of gateway devices corresponds to one index. In a possible implementation, the correspondences between the plurality of gateway devices and the indexes include an identifier of each gateway device in the plurality of gateway devices and an index corresponding to each gateway device in the plurality of gateway devices, and the identifier of each gateway device includes an internet protocol (IP) address of each gateway device. In a possible implementation, the identifier of each gateway device further includes a port identifier of a communication port of each gateway device.

For example, the computing node stores a gateway mapping (map) table, and the correspondences between the plurality of gateway devices and the indexes are recorded in the gateway mapping table. For example, the storage cluster includes M gateway devices. Refer to a gateway mapping table shown in the following Table 1, where M is an integer greater than or equal to 1.

TABLE 1

| | Identifier of a gateway device | |
|---|---|---|
| Index | IP address of the gateway device | Port identifier of the gateway device (optional) |
| 1 | IP address of a gateway device 1 | Port identifier of the gateway device 1 |
| 2 | IP address of a gateway device 2 | Port identifier of the gateway device 2 |
| . . . | . . . | . . . |
| M | IP address of a gateway device M | Port identifier of the gateway device M |

In a possible implementation, the manner A may be implemented by using the following steps A1 to A3.

Step A1: The computing node performs hash calculation on an identifier of the file carried in the data processing request, to obtain a hash value of the file.

Step A2: The computing node obtains a target index based on the hash value.

The target index is an index corresponding to the first gateway device. In a possible implementation, the target index is a remainder of the hash value and a quantity of the plurality of gateway devices.

For example, there are M gateway devices. The computing node performs a modulo operation on the hash value and M, and an obtained modulo result is the target index. The modulo result is the remainder between the hash value and the quantity of the plurality of gateway devices.

Step A3: The computing node determines, based on the correspondences between the plurality of gateway devices and the indexes, a gateway device that is in the plurality of gateway devices and that corresponds to the target index as the first gateway device.

After obtaining the target index, the computing node queries the gateway mapping table for the identifier of the gateway device corresponding to the target index, and uses the gateway device indicated by the identifier as the first gateway device. For example, if the target index is 2, the computing node uses the gateway device 2 corresponding to the target index 2 as the first gateway device.

Manner B: The computing node selects the first gateway device according to a random selection rule.

In a possible implementation, the computing node randomly selects any one gateway device from the plurality of gateway devices as the first gateway device. For example, the computing node determines a gateway device corresponding to any one index in the gateway mapping table as the first gateway device.

Optionally, in addition to selecting the first gateway device in the foregoing manner A or manner B, a first gateway device may alternatively be selected based on load of each gateway device. To be specific, the computing node may further implement a load balancing function, balance a service processing status based on a load status of each gateway device, fully use each gateway device, and improve utilization of devices in the entire system.

Step 203: The computing node sends the data processing request to the first gateway device, and the first gateway device forwards the data processing request to the storage node in the storage cluster to complete the processing of the file.

Step 204: The first gateway device receives the data processing request.

Step 205: The first gateway device sends the data processing request to the storage node in the storage cluster.

In a possible implementation, after receiving the data processing request, the first gateway device determines, based on the data processing request, at least one storage node from a plurality of storage nodes in the storage cluster, and sends the data processing request to the at least one storage node. The at least one storage node is a storage node configured to process the data processing request.

For example, if the data processing request is the read request, the first gateway device queries, based on the identifier of the file in the data processing request, for metadata of the file in recorded metadata of the plurality of files, where metadata of each file includes a storage address of each file. When the metadata of the file is found, the first gateway device determines, from the plurality of storage nodes, a storage node to which a storage address of the file belongs as the at least one storage node. In a possible implementation, a storage address of one file includes a storage address of at least one object corresponding to the file. The at least one object forms the file, and one object is a minimum unit for data storage in a storage cluster. In a possible implementation, original data of each file further includes an identifier of at least one object corresponding to each file, and an identifier of each object indicates one object and indicates a location of the object in a file.

For another example, if the data processing request is the write request, the first gateway device obtains the file from the data processing request, and determines, based on a size of the file, the at least one storage node from the plurality of storage nodes in the storage cluster. A size of remaining storage space of each storage node in the at least one storage node is greater than or equal to the size of the file.

The first gateway device may further split the file into at least one object, generate an identifier of the at least one object, and separately add the identifier of the object to the at least one object. The first gateway device modifies the file in the data processing request to the at least one object to which the identifier is added, and sends a modified data processing request to the at least one storage node.

Then, the first gateway device may further create the metadata of the file, and add the identifier of the at least one object and the identifier of the file to the metadata of the file.

Step 206: The storage node receives the data processing request.

Step 207: The storage node processes the file based on the data processing request.

In a possible implementation, if the data processing request is the write request, the storage node stores the at least one object carried in the data processing request, and stores the identifier of the at least one object, the storage address of the at least one object, and the identifier of the file in the data processing request in an associated manner, to establish a correspondence between the file and the at least one object.

In a possible implementation, if the data processing request is the read request, the storage node queries, based on a correspondence between a file and an object, for a storage address of at least one object corresponding to the file. The storage node obtains the at least one object at the storage address of the at least one object.

After processing the data processing request, the storage node generates a data processing response, and sends the data processing response to the first gateway device, where the data processing response indicates that the file has been processed. If the data processing request is the read request, the data processing response carries the at least one object that is of the file and that is read from the storage node. If the data processing request is the write request, the data processing response carries the storage address of the at least one object of the file.

It can be learned from the foregoing descriptions that a computing node in a computing cluster implements a function of a load balancer, so that the computing node may select a gateway device from a plurality of gateway devices in a storage cluster to send a data processing request. In a data processing process, the computing node does not need to select the gateway device for the data processing request by using a load balancing cluster. Therefore, when a storage system in which storage and computing are decoupled is constructed, the load balancing cluster does not need to be deployed. In this way, costs of constructing the storage system in which storage and computing are decoupled are reduced.

Figure 3A:
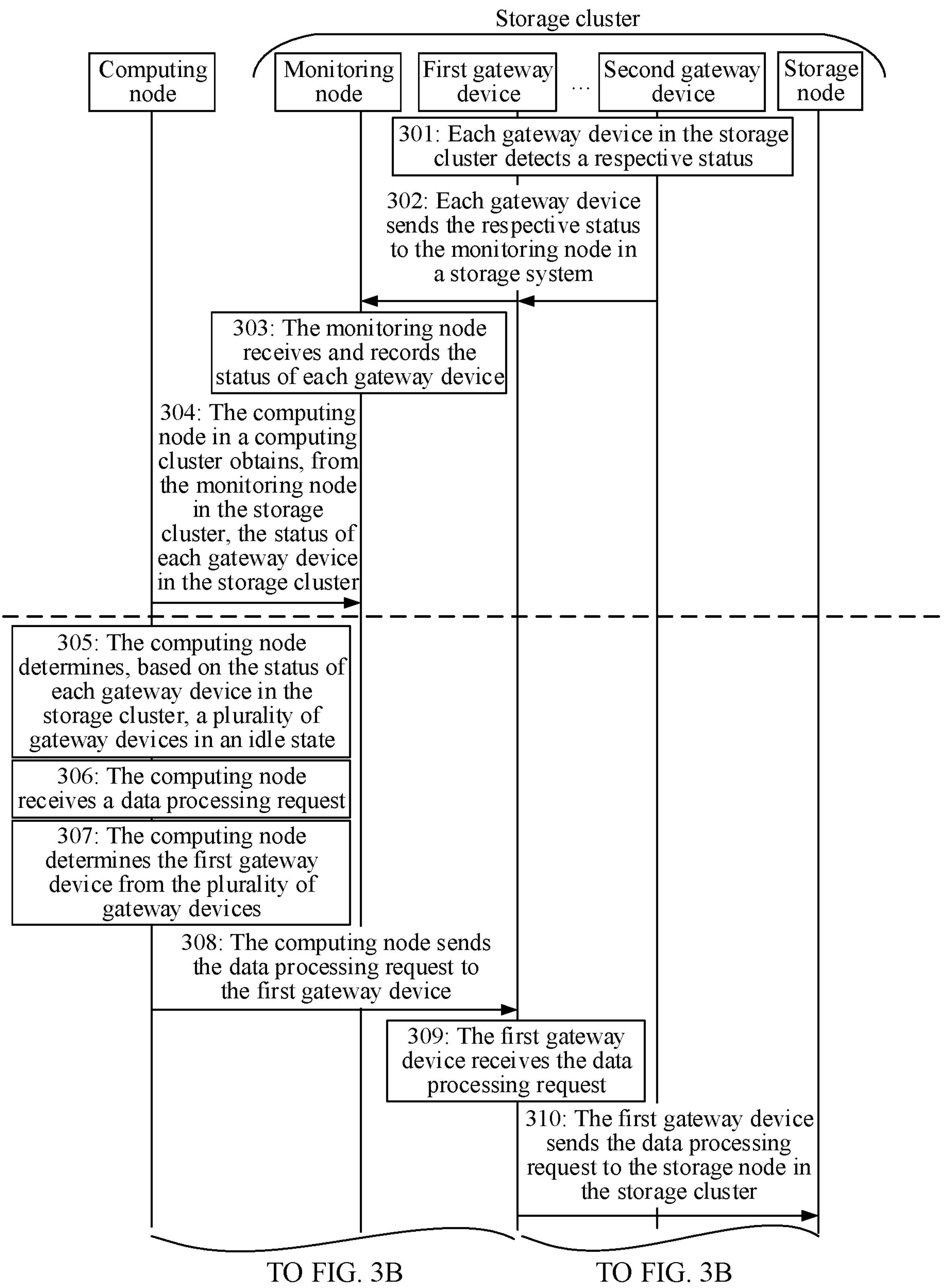
FIG. 3A and FIG. 3B are a flowchart of a data processing method according to this application.
Figure 3B:
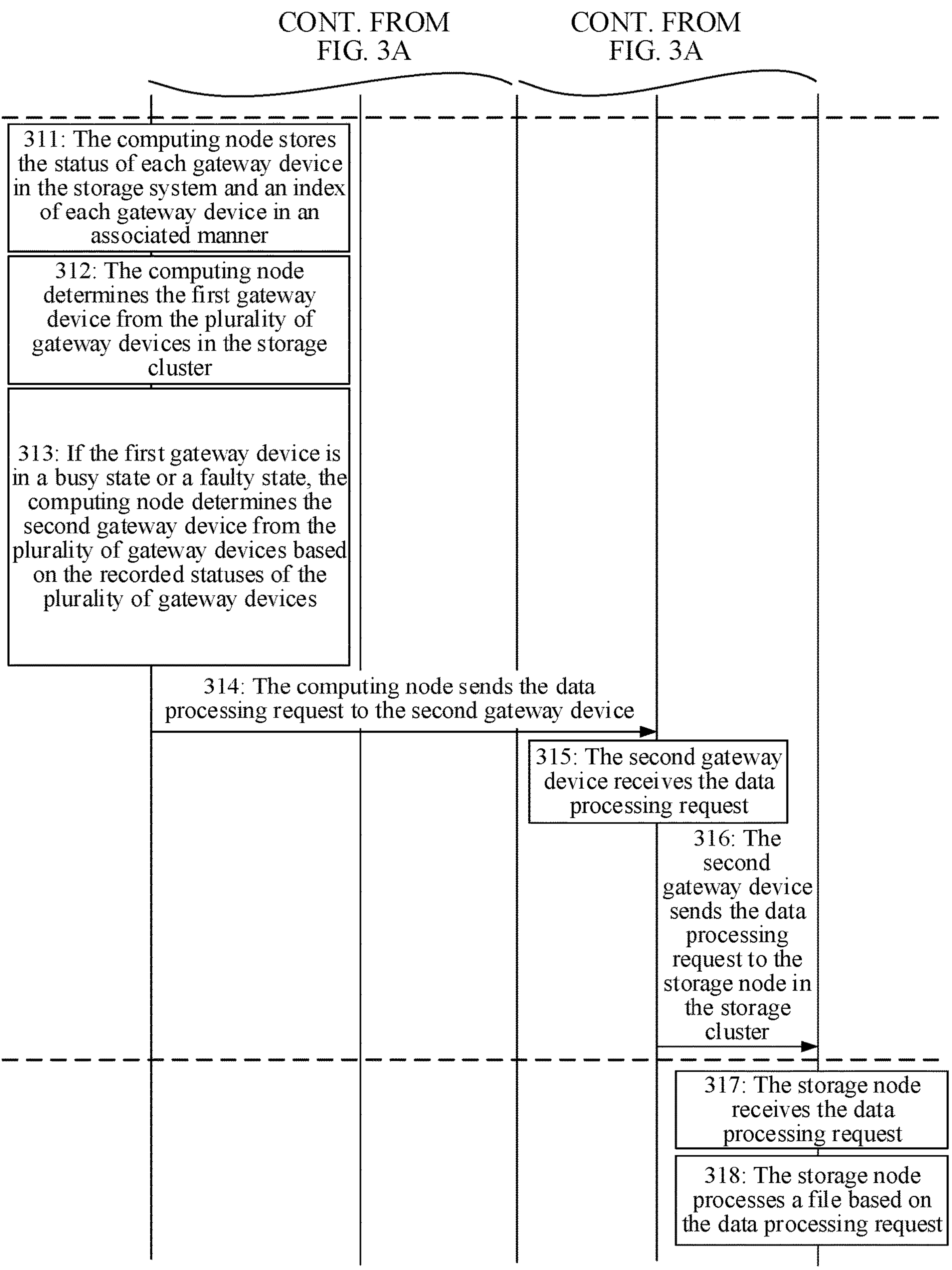

The process shown in FIG. 2 is a process in which a computing node selects one gateway device from a plurality of recorded gateway devices in a storage cluster to access the storage cluster. In another possible implementation, to improve efficiency of processing a data processing request, when selecting a gateway device for a new data processing request, the computing node may further consider a status of the gateway device. For example, FIG. 3A and FIG. 3B are a flowchart of a data processing method according to this application. A process shown in FIG. 3A and FIG. 3B is a process in which a computing node selects, based on recorded statuses of a plurality of gateway devices in a storage cluster, one gateway device from the plurality of gateway devices in the storage cluster, to access the storage cluster. The method is applied to a storage system in which storage and computing are decoupled. The storage system in which storage and computing are decoupled may be the storage system shown in FIG. 1.

Step 301: For each gateway device in a storage cluster, a gateway monitoring module in each gateway device detects a status of corresponding gateway software.

Each gateway device includes a gateway monitoring module, and gateway software is disposed in each gateway device. The gateway monitoring module is configured to detect, in real time or periodically, a status of gateway software of a gateway device to which the gateway monitoring module belongs, and report the status of the gateway software. The gateway software is configured to forward a message sent by a device outside the storage cluster to a storage node in the storage cluster, so that the device outside the storage cluster can access the storage node in the storage cluster. For example, the gateway software may forward a received data processing request to the storage node in the storage cluster. For another example, the foregoing step 205 may be performed by gateway software in a first gateway device. The gateway software may be RGW software, or other gateway software that can provide an interface for the device outside the storage cluster to access the storage cluster.

A status of gateway software in a gateway device includes any one of an idle state, a busy state, or a faulty state. The idle state means that a quantity of to-be-forwarded data processing requests in the gateway device is less than or equal to a first threshold. If receiving a new data processing request, the gateway device in the idle state may forward the new data processing request in short time (for example, preset duration). The busy state means that a quantity of to-be-forwarded data processing requests in the gateway device is greater than a first threshold. If receiving a new data processing request, the gateway device in the busy state cannot forward the new data processing request in short time, and the new data processing request needs to wait for forwarding in a queue in the gateway device. The first threshold may be set by a related skilled person based on a specific implementation scenario. The first threshold is not limited herein in this embodiment of this application.

Using one gateway device as an example, a gateway monitoring module in the gateway device detects a status of gateway software of the gateway device in which the gateway monitoring module is located. For example, the gateway monitoring module detects whether the gateway software in the gateway device in which the gateway monitoring module is located is faulty. If the gateway software is faulty, it is determined that the gateway software is in the faulty state (in other words, the gateway device is in the faulty state). If the gateway software is not faulty, the gateway monitoring module detects a quantity of to-be-forwarded data processing requests in the gateway device. If the quantity of the to-be-forwarded data processing requests is less than or equal to the first threshold, it indicates that load of the gateway software is light, and the gateway monitoring module determines that the gateway software is in the idle state (in other words, the gateway device is in the idle state). If the quantity of the to-be-forwarded data processing requests is greater than the first threshold, it indicates that load of the gateway software is high, and the gateway monitoring module determines that the gateway software is in the busy state (in other words, the gateway device is in the busy state).

Step 302: Each gateway monitoring module sends the status of the corresponding gateway software to a monitoring node in the storage system.

The gateway software corresponding to the gateway monitoring module refers to gateway software in the gateway device in which the gateway monitoring module is located. Still using one gateway device as an example, after a gateway monitoring module in the gateway device detects a status of gateway software in the gateway device, the gateway monitoring module sends a status notification message to the monitoring node, where the status notification message includes an identifier of the status of the gateway software. Each status of the gateway software is represented by an identifier of each status, and identifiers of different statuses may be represented in different manners. For example, an identifier of the busy state is "00", an identifier of the idle state is "01", and an identifier of the faulty state is "11".

The status notification message may be a heartbeat message or a message of another message type.

Step 303: The monitoring node obtains and records the status of the gateway software of each gateway device.

Still using one gateway device as an example, after receiving a status notification message of one gateway device, the monitoring node stores an identifier of a status that is of gateway software and that is in the status notification message and an IP address of the gateway device in an associated manner. In a possible implementation, the monitoring node stores a gateway status table, and the gateway status table is used to record a status of the gateway software in each gateway device in the storage cluster. Each time the monitoring node receives a status of gateway software of one gateway device, the monitoring node records the status of the gateway software of the gateway device in the gateway status table. For example, the storage cluster includes M gateway devices. Refer to a gateway status table shown in the following Table 2.

TABLE 2

| IP address of a gateway device | Status of the gateway device |
|---|---|
| IP address of a gateway device 1 | Busy state (00) |
| IP address of a gateway device 2 | Idle state (01) |
| . . . | . . . |
| IP address of a gateway device M | Faulty state (11) |

In a possible implementation, the faulty state of the gateway software is not obtained by the monitoring node from the status notification message, but the gateway monitoring module in each gateway device in the storage cluster periodically sends status notification messages to the monitoring node. When gateway software in one gateway device is in the faulty state, a monitoring module in the gateway device does not send a status notification message to the monitoring node. Correspondingly, if the monitoring node does not receive the status notification message from the gateway device within the preset duration, it indicates that the gateway software in the gateway device is in the faulty state, and the monitoring node records a status of the gateway software of the gateway device as the faulty state. The preset duration is a sending period of periodically sending a status notification message by a gateway monitoring module. In this case, the status notification message may not carry the identifier of the faulty state.

A process shown in steps 302 and 303 is a process in which the gateway devices in the storage cluster actively report the statuses of the respective gateway software to the monitoring node. In another possible implementation, the monitoring node queries, in each gateway device, for a status of gateway software, and records a found status of gateway software. For example, the monitoring node sends a query request to each gateway device in the storage cluster, where the query request is used to query for a status of gateway software in the gateway device. After receiving the query request, the gateway monitoring module in each gateway device sends the status of the corresponding gateway software to the monitoring node, so that the monitoring node records the status of the gateway software.

Step 304: The computing node in the computing cluster obtains, from the monitoring node in the storage cluster, the status of the gateway software of each gateway device in the storage cluster, and uses the status of the gateway software of each gateway device as the status of each gateway device.

The computing node is any one computing node in the computing cluster, and each computing node in the computing cluster may perform step 304.

The computing node sends a gateway status obtaining request to the monitoring node, where the gateway status obtaining request indicates to obtain the status of each gateway device in the storage cluster.

After receiving the gateway status obtaining request, the monitoring node sends a gateway status obtaining response to the computing node, where the gateway status obtaining response carries an identifier of the status of each gateway device in the storage cluster and an IP address of each gateway device. For example, the gateway status obtaining response carries a gateway status table in the monitoring node.

The computing node receives the gateway status obtaining response from the monitoring node, and obtains, from the gateway status obtaining response, the identifier of the status of each gateway device in the storage cluster.

It should be noted that step 304 is a possible implementation in which one computing node obtains the status of each gateway device in the storage cluster. In another possible implementation, the computing node obtains, from another computing node in the storage cluster, the status of the gateway software of each gateway device in the storage cluster. For example, a first computing node in the computing cluster obtains the status of each gateway device in the storage cluster from the monitoring node, and sends the status of each gateway device in the storage cluster to each computing node in the computing cluster. Then, the computing node receives the status of each gateway device in the storage cluster from the first computing node, where the first computing node is any one computing node in the storage cluster except the computing node.

For another example, the storage cluster does not include the monitoring node, and the computing node obtains the status of gateway software of each gateway device from each gateway device in the storage cluster. A process in which the computing node obtains the status of the gateway software of each gateway device from each gateway device in the storage cluster is similar to a process in which the monitoring node obtains the status of the gateway software of each gateway device. Herein, a process in which the computing node obtains the status of the gateway software of each gateway device from each gateway device in the storage cluster is not described in this embodiment of this application.

For another example, each gateway device in the storage cluster sends the status of the gateway software of each gateway device to the first computing node in the computing cluster, and then the computing node may obtain the status of the gateway software of each gateway device in the storage cluster from the first computing node.

Step 305: The computing node determines, based on the status of each gateway device in the storage cluster, the plurality of gateway devices in the idle state.

In a possible implementation, if a status of any one gateway device in the storage cluster is the idle state, the computing node determines that the any one gateway device is one of the plurality of gateway devices.

In another possible implementation, a correspondence between each gateway device in the storage cluster and an index is recorded in the computing node. If a status of any one gateway device in the storage cluster is the busy state or the faulty state, the computing node deletes a recorded correspondence between the any one gateway device and an index, and uses an index of each gateway device after the any one gateway device as an index of one previous gateway device of each gateway device.

The foregoing Table 1 is used as an example. If the gateway device 1 is in the faulty state, and all the gateway devices except the gateway device 1 in the storage cluster are in the idle state, the computing node deletes a correspondence between the gateway device 1 and the index 1 in Table 1, and enables the identifiers of the gateway devices 2 to M to correspond to indexes 1 to M−1, so that the indexes of the gateway devices 2 to M are updated to the indexes of the gateway devices 1 to M−1, as shown in Table 3 below.

TABLE 3

| | Identifier of a gateway device | |
|---|---|---|
| Index | IP address of the gateway device | Port identifier of the gateway device (optional) |
| 1 | IP address of a gateway device 2 | Port identifier of the gateway device 2 |
| 2 | IP address of a gateway device 3 | Port identifier of the gateway device 3 |
| . . . | . . . | . . . |
| M-1 | IP address of a gateway device M-1 | Port identifier of the gateway device M-1 |

After the computing node deletes the correspondence between the gateway device in the faulty state or the busy state and the index, in other words, for the computing node, the gateway device in the faulty state or the busy state in the storage cluster is removed, the plurality of gateway devices recorded by the computing node in this case are all in the idle state.

It should be noted that the process shown in steps 301 to 305 may be performed in real time, or may be performed periodically. Duration of an execution period of steps 301 to 305 is not limited in this embodiment of this application.

Step 306: The computing node receives the data processing request, where the data processing request indicates to process a file.

Step 306 is similar to step 201. Herein, step 306 is not described in detail in this embodiment of this application.

Step 307: The computing node determines a first gateway device from the plurality of gateway devices.

Step 307 is similar to step 202. Herein, step 307 is not described in detail in this embodiment of this application.

Step 308: The computing node sends the data processing request to the first gateway device.

Step 309: The first gateway device receives the data processing request.

Step 310: The first gateway device sends the data processing request to the storage node in the storage cluster.

Step 310 is similar to step 205. Herein, step 310 is not described in detail in this embodiment of this application.

In another possible implementation, the process shown in the foregoing steps 305 to 310 may be replaced with a process shown in the following steps 311 to 314.

Step 311: The computing node records a correspondence between a status of each gateway device in the storage system and an index of each gateway device.

For example, the computing node may store, in a gateway mapping table, an identifier of the status of each gateway device, so that the status of each gateway device corresponds to the index of each gateway device. For example, the storage cluster includes M gateway devices. The status of each gateway device is recorded in the gateway mapping table shown in Table 1, to obtain the following Table 4.

TABLE 4

| | | Identifier of the gateway device | |
|---|---|---|---|
| Index | Status of a gateway device | IP address of the gateway device | Port identifier of the gateway device (optional) |
| 1 | Busy state (00) | IP address of a gateway device 1 | Port identifier of the gateway device 1 |
| 2 | Idle state (01) | IP address of a gateway device 2 | Port identifier of the gateway device 2 |
| . . . | . . . | . . . | . . . |
| M | Faulty state (11) | IP address of a gateway device M | Port identifier of the gateway device M |

Step 312: The computing node determines the first gateway device from the plurality of gateway devices in the storage cluster.

Step 312 is similar to step 202. Herein, step 312 is not described in detail in this embodiment of this application.

Step 313: If the first gateway device is in the busy state or the faulty state, the computing node determines, based on the recorded statuses of the plurality of gateway devices, a second gateway device from the plurality of gateway devices, where the second gateway device is any one gateway device that is in the plurality of gateway devices and that is in the idle state.

If the first gateway device is in the busy state or the faulty state, the computing node queries the gateway mapping table, and determines any one gateway device that is recorded in the gateway mapping table and that is in the idle state as the second gateway device.

The gateway mapping table shown in Table 4 is used as an example. If the first gateway device is the gateway device 1, it can be learned from Table 4 that the gateway device 1 is in the busy state. To prevent the data processing request from waiting for forwarding in a queue in the gateway device 1 for long time, the computing node determines the gateway device 2 in the idle state as the second gateway device.

Step 314: The computing node sends the data processing request to the second gateway device, and the second gateway device forwards the data processing request to the storage node in the storage cluster to complete the processing of the file.

Step 315: The second gateway device receives the data processing request.

Step 316: The second gateway device sends the data processing request to the storage node in the storage cluster.

Step 316 is similar to step 205. Herein, step 316 is not described in detail in this embodiment of this application.

Step 317: The storage node receives the data processing request.

The data processing request comes from the first gateway device or the second gateway device.

Step 318: The storage node processes the file based on the data processing request.

Step 318 is similar to step 207. Herein, step 318 is not described in detail in this embodiment of this application.

It can be learned from the foregoing descriptions that a computing node in a computing cluster implements a function of a load balancer, so that the computing node may select a gateway device from a plurality of gateway devices in a storage cluster to send a data processing request. In a data processing process, the computing node does not need to select the gateway device for the data processing request by using a load balancing cluster. Therefore, when a storage system in which storage and computing are decoupled is constructed, the load balancing cluster does not need to be deployed. In this way, costs of constructing the storage system in which storage and computing are decoupled are reduced. In addition, when selecting a gateway device, the computing node selects a gateway device in the idle state instead of a gateway device in the busy state or the faulty state, so that a case in which the data processing request waits for forwarding in a queue in the gateway device that is in the busy state for long time and a case in which a faulty gateway device does not forward the data processing request can be avoided, and efficiency of processing the data processing request is improved.

In the process shown in FIG. 3A and FIG. 3B, the plurality of gateway devices are in a primary/secondary relationship. If a gateway device first selected by the computing node is in the faulty state, the computing node selects one gateway device in the idle state again to send the data processing request.

In another possible implementation, one storage cluster corresponds to one or more computing clusters, each gateway device in the storage cluster includes one or more communication ports, and each communication port is configured to communicate with one computing cluster, in other words, is configured to receive a message sent by the computing cluster and send a message to the computing cluster, so that each gateway device can communicate with the one or more computing clusters by using the one or more communication ports.

M resource pools are deployed in the storage cluster, each resource pool includes N+1 pieces of gateway software, each resource pool corresponds to one IP address and at least one port identifier, and each port identifier in the at least one port identifier corresponds to one computing cluster, to indicate a communication port indicated by one port identifier in a gateway device in the storage cluster to communicate with a corresponding computing cluster. Both M and N are integers greater than 1. The N+1 pieces of gateway software in each resource pool are deployed in R gateway devices, and at least one piece of gateway software is deployed in any one gateway device in the R gateway devices, where R is an integer greater than or equal to 1 and less than or equal to N+1. A related skilled person randomly selects, from the R gateway devices in each resource pool, any one gateway device as a primary gateway device of each resource pool, and uses each gateway device except the primary gateway device in the R gateway devices in each resource pool as a secondary gateway device.

For ease of distinguishing between a primary gateway device and a secondary gateway device in a same resource pool, the related skilled person configures an IP address of the primary gateway device in each resource pool as an IP address corresponding to each resource pool, and configures an IP address of the secondary gateway device in each resource pool as any one IP address except the IP address corresponding to each resource pool.

For ease of switching of primary gateway software and secondary gateway software in a same resource pool, for any one computing cluster in the at least one computing cluster and any one resource pool in the M resource pools, the related skilled person configures an identifier of a communication port that is in each gateway device of the any one resource pool and that is used to communicate with the any one computing cluster as a port identifier that corresponds to the any one computing cluster and that is in at least one port identifier corresponding to the any one resource pool. In each computing node in the any one computing cluster, an IP address corresponding to the any one resource pool and a port identifier that is corresponding to the any one computing cluster and that is in the at least one port identifier corresponding to the any one resource pool are recorded as an identifier of a primary gateway device of the any one resource pool.

In a working process of the storage cluster, the primary gateway devices of the M resource pools provide a service for the computing cluster to access the storage cluster. It may also be understood that M*R gateway devices are deployed in the storage cluster, M primary gateway devices in the M*R gateway devices provide the service for the computing cluster to access the storage cluster, and each secondary gateway device in the M*R gateway devices temporarily does not provide the service for the computing cluster to access the storage cluster.

At least one piece of gateway software in one resource pool is deployed in each primary gateway device, and each primary gateway device randomly selects one piece of gateway software from the deployed at least one piece of gateway software, to provide the service for the computing cluster to access the storage cluster, in other words, each primary gateway device randomly runs one piece of gateway software, to provide the service for the computing cluster to access the storage cluster. For ease of description, gateway software run by each primary gateway device is used as primary gateway software in a resource pool to which each gateway device belongs, and all gateway software in each resource pool except the primary gateway software is secondary gateway software. It may also be understood that each resource pool includes one piece of primary gateway software and N pieces of secondary gateway software, and a gateway device in which the primary gateway software of each resource pool is located is the primary gateway device of each resource pool. In this case, the status of the primary gateway device is also the status of the primary gateway software in the primary gateway device. When one piece of primary gateway software is in the faulty state or the busy state, the primary gateway device may switch the currently used primary gateway software to secondary gateway software in a resource pool to which the primary gateway device belongs, and switch one piece of secondary gateway software in the resource pool to primary gateway software. To further describe the process, refer to a flowchart of a method for switching between a primary gateway device and a secondary gateway device according to this application shown in FIG. 4. The method is applied to a storage system in which storage and computing are decoupled. The storage system in which storage and computing are decoupled may be the storage system shown in FIG. 1.

Step 401: A gateway monitoring module of a gateway device detects a status of primary gateway software in the gateway device.

The gateway device is a primary gateway device of any one resource pool in M resource pools of a storage cluster, includes primary gateway software in the any one resource pool, and when the primary gateway software is in an idle state, the primary gateway software in the gateway device receives and sends a data processing request.

A process in which the gateway monitoring module detects the status of the primary gateway software in the gateway device is a process in which the gateway monitoring module detects a status of gateway software in the gateway device. The process in which the gateway monitoring module detects the status of the gateway software in the gateway device is described in 301. Herein, details are not described in step 401 in this embodiment of this application.

Step 402: If the primary gateway software is in a faulty state or a busy state, the gateway monitoring module runs one piece of secondary gateway software in the resource pool in which the primary gateway software is located, and the run secondary gateway software receives and sends the data processing request.

The gateway monitoring module runs the secondary gateway software to replace the primary gateway software in the faulty state or the busy state, so that the run secondary gateway software becomes new primary gateway software in the any one resource pool. The primary gateway software in the faulty state or the busy state is switched to secondary gateway software in the any one resource pool.

In a possible implementation, the gateway monitoring module runs the one piece of secondary gateway software in the resource pool in which the primary gateway software is located in either output manner 1 or 2.

Manner 1: If the gateway device further includes K pieces of secondary gateway software in the resource pool in which the primary gateway software is located, the gateway monitoring module runs any one piece of secondary gateway software in the K pieces of secondary gateway software, where K is an integer greater than or equal to 1 and less than or equal to N.

Because the primary gateway software and the K pieces of secondary gateway software are both deployed in the gateway device, the primary gateway software and the K pieces of secondary gateway software share an IP address of the gateway device (namely, an IP address corresponding to the any one resource pool), and share a same communication port of the gateway device to communicate with a computing cluster. Therefore, the gateway monitoring module runs any one piece of secondary gateway software in the K pieces of secondary gateway software to replace the primary gateway software in the busy state or the faulty state, and the gateway device is still the primary gateway device of the any one resource pool. Because an identifier that is of the primary gateway device in the any one resource pool and that is recorded in each computing node in the computing cluster includes the IP address and a port identifier that correspond to the any one resource pool, and the identifier that is of the primary gateway device and that is recorded in the computing node does not change, even if gateway software in the primary gateway device is switched, the computing node cannot sense the switching.

Manner 2: If the one piece of secondary gateway software in the resource pool in which the primary gateway software is located is deployed in a secondary gateway device, the gateway monitoring module sends an address update request to the secondary gateway device, where the address update request indicates the secondary gateway device to modify an IP address to an IP address of the gateway device, and run secondary software in the secondary gateway device.

The address update request carries the IP address of the gateway device.

After sending the address update request, the gateway monitoring module may further modify the IP address of the gateway device to any one IP address except IP addresses corresponding to the M resource pools, so that the primary gateway software is switched to the secondary gateway software, and the primary gateway device is also switched to the secondary gateway device.

After receiving the address update request, the secondary gateway device parses out the IP address of the gateway device from the address update request, and updates the IP address of the secondary gateway device to the IP address of the gateway device. After the address is updated, the IP address of the secondary gateway software in the secondary gateway device is an IP address of the primary gateway device, and the secondary gateway device runs the secondary gateway software in the secondary gateway device. In this case, the secondary gateway software in the secondary gateway device becomes the primary gateway software in the any one resource pool, and the secondary gateway device becomes a latest primary gateway device in the any one resource pool.

The identifier that is of the primary gateway device of the any one resource pool and that is recorded in each computing node of the computing cluster includes the IP address and the port identifier of the communication port that correspond to the any one resource pool, and the identifier of the communication port used when each gateway device of the any one resource pool communicates with the computing cluster is the identifier of the communication port corresponding to the any one resource. The secondary gateway device modifies the IP address of the secondary gateway device to the IP address of the primary gateway device, to replace the primary gateway device in the busy state or the faulty state, and the computing node cannot sense the modification. Therefore, for the computing node, the identifier that is of the primary gateway device and that is recorded by the computing node does not change.

In this case, because the computing node does not sense the switching process of the primary gateway software and the secondary gateway software in the resource pool, a monitoring node may not be deployed in the storage cluster. Certainly, to prevent a case in which all gateway software in the resource pool is in the faulty state or the busy state and the computing node cannot sense the situation, the monitoring node may still be deployed in the storage cluster. Usually, the secondary gateway device does not work, and the secondary gateway device is switched to the primary gateway device to start working only when the current primary gateway device is faulty or busy. Therefore, the monitoring node only needs to collect the status of the primary gateway software in the resource pool, and does not need to collect a status of the secondary gateway software in the resource pool. Correspondingly, the computing node obtains the status of the primary gateway software in the resource pool from the monitoring node.

Step 403: The secondary gateway software in the gateway device receives the data processing request of the computing node in the computing cluster, where the data processing request indicates to process a file, and the gateway device is determined by the computing node from a plurality of gateway devices in the storage cluster.

In this case, the gateway device may be a first gateway device determined by the computing node from the plurality of gateway devices in the storage cluster. A process shown in step 403 is also a process in which the gateway device receives the data processing request of the computing node in the computing cluster.

Step 404: The secondary gateway software sends the data processing request to the storage node in the storage cluster.

A process shown in step 404 is also a process in which the gateway device sends the data processing request to the storage node in the storage cluster.

Step 405: The storage node receives the data processing request.

Step 405 is similar to step 206. Herein, step 405 is not described in detail in this embodiment of this application.

Step 406: The storage node processes the file based on the data processing request.

Step 406 is similar to step 207. Herein, step 406 is not described in detail in this embodiment of this application.

It can be learned from the foregoing descriptions that a computing node in a computing cluster implements a function of a load balancer, so that the computing node may select a gateway device from a plurality of gateway devices in a storage cluster to send a data processing request. In a data processing process, the computing node does not need to select the gateway device for the data processing request by using a load balancing cluster. Therefore, when a storage system in which storage and computing are decoupled is constructed, the load balancing cluster does not need to be deployed. In this way, costs of constructing the storage system in which storage and computing are decoupled are reduced. In addition, the computing node does not sense a switching process between a primary gateway device and a secondary gateway device that are in the storage cluster, and each gateway device recorded by the computing node is in an idle state. Therefore, when selecting a gateway device, the computing node selects a gateway device in the idle state instead of a gateway device in a busy state or a faulty state, so that a case in which the data processing request waits for forwarding in a queue in the gateway device that is in the busy state for long time and a case in which a faulty gateway device does not forward the data processing request can be avoided, and efficiency of processing the data processing request is improved.

It should be noted that the computing node in this application includes a computer-readable storage medium, the computer-readable storage medium stores a load balancing software package, and program code in the load balancing software package is used to implement the foregoing data processing method. For example, a processor of the computing node reads and runs the program code in the load balancing software package, to enable the computing node to perform the foregoing data processing method.

In a possible implementation, the program code in the load balancing software package is generated based on a code generation library (CGLIB). For example, the program code in the load balancing software package is formed by splicing bytecodes in the CGLIB. The CGLIB is a powerful and high-performance code generation library, and a load software package generated based on the CGLIB has a small code amount. For example, an estimated code amount of the load software package may reach 3000 lines, but an actual code amount of the generated load balancing software package is fewer than 300 lines.

The CGLIB is widely applied to an aspect oriented programming (AOP) frame, and can be used to provide a method for operation interception. In this case, the computing node may load, in a form of a patch, the load balancing software package generated based on the CGLIB to source code of the computing cluster. In a process of running the source code of the computing cluster, the processor of the computing node may execute the load balancing software package loaded in the source code, to enable the computing node to perform the foregoing data processing method. Therefore, on a basis of implementing load balancing, modification of the source code of the computing cluster can be avoided, and concern of a user about reliability and security of a computing cluster to which a load balancing function is newly added can be eliminated.

The foregoing describes the method in embodiments of this application, and the following describes an apparatus in embodiments of this application. It should be understood that the apparatus described below has any function of the computing node in the foregoing method.

Figures 4, 5:
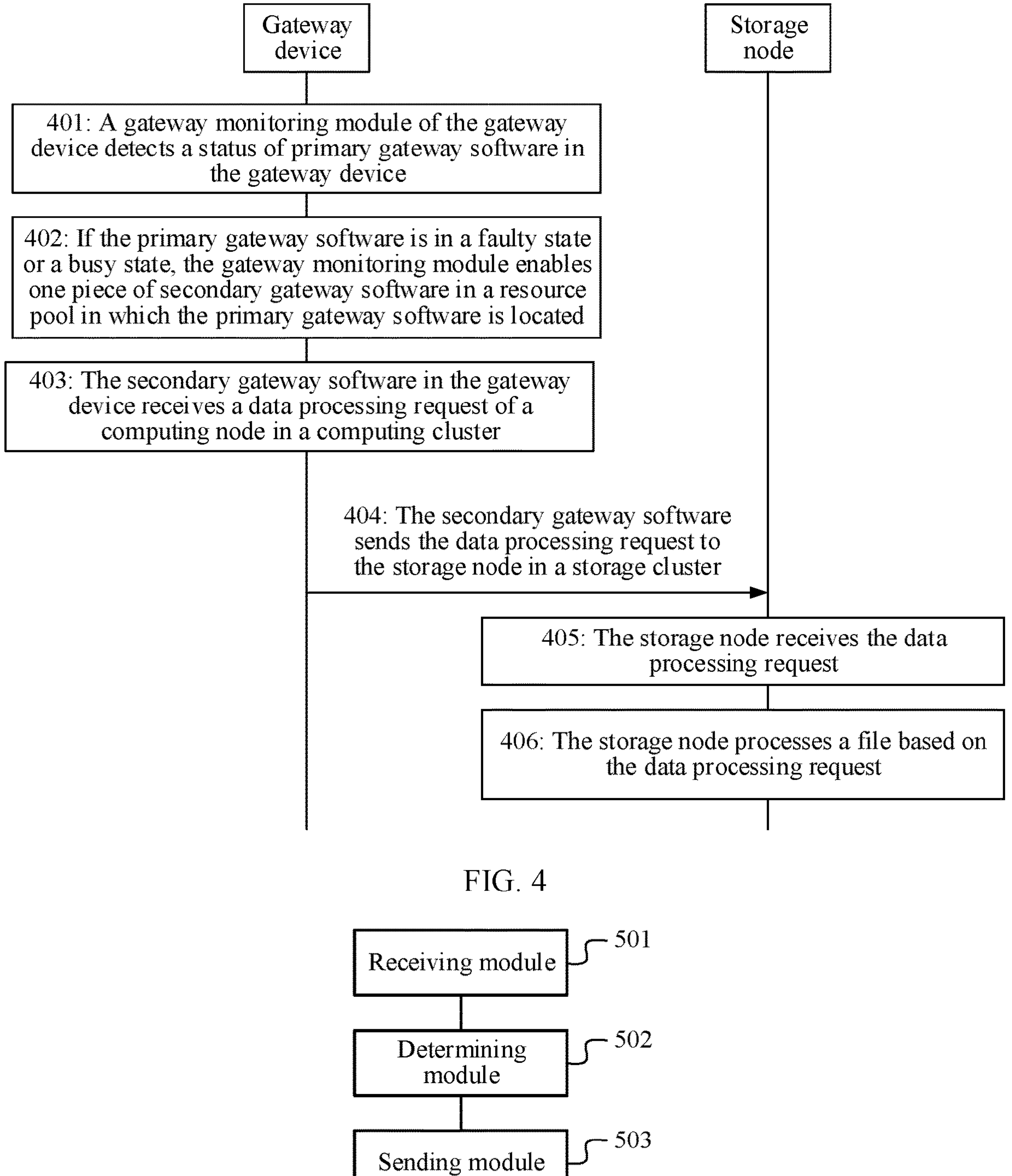
FIG. 4 is a flowchart of a method for switching between a primary gateway device and a secondary gateway device according to this application.
FIG. 5 is a schematic diagram of a structure of a data processing apparatus according to this application.

FIG. 5 shows a data processing apparatus according to this application. An apparatus 500 may be a part of the computing node in the foregoing embodiments or FIG. 2 to FIG. 5, and is configured to perform a method performed by the computing node. The apparatus 500 is used in a storage system in which storage and computing are decoupled, the storage system includes a computing cluster and a storage cluster, the apparatus 500 is configured as a computing node in the computing cluster, and the apparatus 500 includes:

a receiving module 501, configured to receive a data processing request, where the data processing request indicates to process a file;

a determining module 502, configured to determine a first gateway device from a plurality of gateway devices in the storage cluster; and a sending module 503, configured to send the data processing request to the first gateway device, where the first gateway device forwards the data processing request to a storage node in the storage cluster to complete the processing of the file.

It should be understood that the apparatus 500 in this embodiment of the present invention and application may be implemented by using a central processing unit (CPU), may be implemented by using an application-specific integrated circuit (ASIC), or may be implemented by using a programmable logic device (PLD). The PLD may be a complex programmable logic device (CPLD), a field-programmable gate array (FPGA), generic array logic (GAL), or any combination thereof. Alternatively, when the data processing method shown in FIG. 2 to FIG. 4 is implemented by using software, the apparatus 500 and the modules of the apparatus 500 may be software modules.

In a possible implementation, correspondences between the plurality of gateway devices and indexes are recorded in the computing node, and each gateway device in the plurality of gateway devices corresponds to one index; and the determining module 502 is configured to:

perform hash calculation on an identifier of the file carried in the data processing request, to obtain a hash value of the file;

obtain a target index based on the hash value; and determine, based on the correspondences between the plurality of gateway devices and the indexes, a gateway device that is in the plurality of gateway devices and that corresponds to the target index as the first gateway device.

In a possible implementation, the correspondences between the plurality of gateway devices and the indexes include an identifier of each gateway device in the plurality of gateway devices and an index corresponding to each gateway device in the plurality of gateway devices, and the identifier of each gateway device includes an internet protocol IP address of each gateway device.

In a possible implementation, the target index is a remainder of the hash value and a quantity of the plurality of gateway devices.

In a possible implementation, the determining module 502 is configured to:

randomly select any one gateway device from the plurality of gateway devices as the first gateway device.

In a possible implementation, the apparatus 500 further includes:

an obtaining module, configured to obtain, from a monitoring node in the storage cluster, a status of each gateway device in the storage cluster, where the status includes any one of an idle state, a busy state, or a faulty state; and the determining module 502 is further configured to determine, based on the status of each gateway device in the storage cluster, the plurality of gateway devices in the idle state.

In a possible implementation, the determining module 502 is further configured to: if the first gateway device is in the busy state or the faulty state, determine, based on recorded statuses of the plurality of gateway devices, a second gateway device from the plurality of gateway devices, where the second gateway device is any one gateway device that is in the plurality of gateway devices and that is in the idle state; and the sending module 503 is further configured to send the data processing request to the second gateway device, where the second gateway device forwards the data processing request to the storage node in the storage cluster to complete the processing of the file.

It should be understood that the apparatus 500 corresponds to the computing node in the foregoing method embodiments, and the modules in the apparatus 500 and the foregoing other operations and/or functions are separately used to implement various steps and methods implemented by the computing node in the method embodiments. For specific details, refer to the foregoing method embodiments. For brevity, details are not described herein again.

It should be understood that, when the apparatus 500 selects a gateway device, division of the foregoing functional modules is merely used as an example for description. In actual application, the foregoing functions may be allocated to different functional modules for implementation based on an actual need. In other words, an internal structure of the apparatus 500 is divided into different functional modules, to implement all or some of the functions described above. In addition, the apparatus 500 provided in the foregoing embodiment is based on a same conception as the foregoing method embodiment. For a specific implementation process of the apparatus 500, refer to the foregoing method embodiment. Details are not described herein again.

It should be understood that the apparatus 500 may be equivalent to the computing node 1011 in the system 100, or equivalent to an execution component in the computing node 1011.

Figure 6:
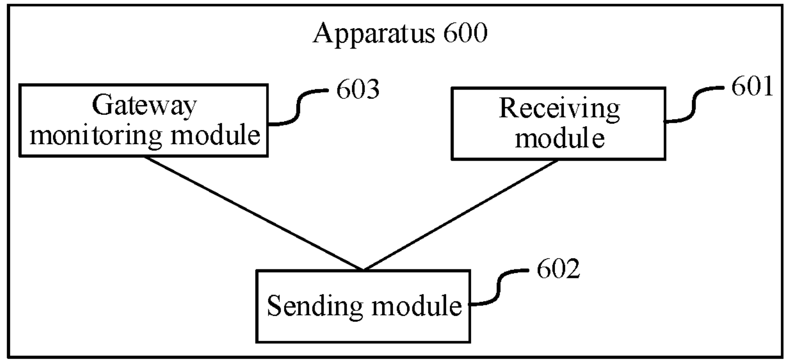
FIG. 6 is a schematic diagram of a structure of a data processing apparatus according to this application.

FIG. 6 shows a data processing apparatus according to this application. An apparatus 600 may be a part of the gateway device in the foregoing embodiments or FIG. 2 to FIG. 5, and is configured to perform a method performed by the gateway device. The apparatus 600 is used in a storage system in which storage and computing are decoupled, the storage system includes a computing cluster and a storage cluster, the apparatus 600 is configured as a gateway device in the storage cluster, and the apparatus 600 includes:

a receiving module 601, configured to receive a data processing request of a computing node in the computing cluster, where the data processing request indicates to process a file, and the gateway device is determined by the computing node from a plurality of gateway devices in the storage cluster; and a sending module 602, configured to send the data processing request to a storage node in the storage cluster, where the storage node processes the file based on the data processing request.

It should be understood that the apparatus 600 in this embodiment of the present invention and application may be implemented by using a central processing unit (CPU), may be implemented by using an application-specific integrated circuit (ASIC), or may be implemented by using a programmable logic device (PLD). The PLD may be a complex programmable logic device (CPLD), a field-programmable gate array (FPGA), a generic array logic (GAL), or any combination thereof. Alternatively, when the data processing method shown in FIG. 2 to FIG. 4 is implemented by using software, the apparatus 600 and the modules of the apparatus 600 may be software modules.

In a possible implementation, the sending module 602 is further configured to:

send a status of the gateway device to a monitoring node in the storage cluster, where the status includes any one of an idle state, a busy state, or a faulty state.

In a possible implementation, the storage cluster includes M resource pools, each resource pool includes one piece of primary gateway software and N pieces of secondary gateway software, and the gateway device includes primary gateway software in one resource pool. The primary gateway software in the gateway device receives and sends the data processing request, where both M and N are integers greater than or equal to 1. The apparatus 600 further includes:

a gateway monitoring module 603, configured to: if the primary gateway software in the gateway device is in the faulty state or the busy state, run one piece of secondary gateway software in the resource pool in which the primary gateway software is located, and the run secondary gateway software receives and sends the data processing request.

In a possible implementation, the gateway monitoring module 603 is configured to:

if the gateway device further includes K pieces of secondary gateway software in the resource pool in which the primary gateway software is located, run any one piece of secondary gateway software in the K pieces of secondary gateway software, where K is an integer greater than or equal to 1 and less than or equal to N; or if the one piece of secondary gateway software in the resource pool in which the primary gateway software is located is deployed in a secondary gateway device, send an address update request to the secondary gateway device, where the address update request indicates the secondary gateway device to modify an IP address to an IP address of the gateway device, and run secondary software in the secondary gateway device.

It should be understood that the apparatus 600 corresponds to the gateway device in the foregoing method embodiments, and the modules in the apparatus 600 and the foregoing other operations and/or functions are separately used to implement various steps and methods implemented by the gateway device in the method embodiments. For specific details, refer to the foregoing method embodiments. For brevity, details are not described herein again.

It should be understood that, when the apparatus 600 forwards the data processing request, division of the foregoing functional modules is merely used as an example for description. In actual application, the foregoing functions may be allocated to different functional modules for implementation based on an actual need. In other words, an internal structure of the apparatus 600 is divided into different functional modules, to implement all or some of the functions described above. In addition, the apparatus 600 provided in the foregoing embodiment is based on a same conception as the foregoing method embodiment. For a specific implementation process of the apparatus 600, refer to the foregoing method embodiment. Details are not described herein again.

It should be understood that the apparatus 600 may be equivalent to the gateway device 1022 in the system 100, or equivalent to an execution component in the gateway device 1022.

Figure 7:
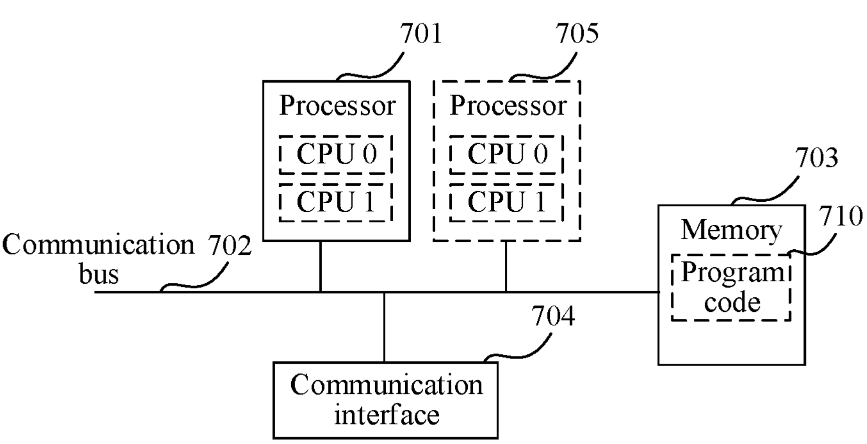
FIG. 7 is a schematic diagram of a structure of a computer device according to this application.

FIG. 7 is a schematic diagram of a structure of a computer device according to this application. A computer device 700 may be any one device in content described in FIG. 1 to FIG. 5, for example, a computing node or a gateway device. The computer device 700 includes at least one processor 701, a communication bus 702, a memory 703, and at least one communication interface 704.

The processor 701 may be a general-purpose central processing unit (CPU), a network processor (NP), a microprocessor, or one or more integrated circuits configured to implement the solutions of this application, for example, an application-specific integrated circuit (ASIC), a programmable logic device (PLD) or a combination thereof. The PLD may be a complex programmable logic device (CPLD), a field-programmable gate array (FPGA), generic array logic (GAL), or any combination thereof.

The communication bus 702 is configured to transmit information between the foregoing components. The communication bus 702 can be divided into an address bus, a data bus, a control bus, and the like. For ease of representation, the bus is represented by using only one bold line in the figure. However, it does not mean that there is only one bus or only one type of bus.

The memory 703 may be a read-only memory (ROM) or another type of static storage device capable of storing static information and instructions, may be a random access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium capable of carrying or storing expected program code in an instruction form or a data structure form and capable of being accessed by a computer. However, the memory is not limited thereto. The memory 703 may exist independently, and is connected to the processor 701 through the communication bus 702. The memory 703 may further be integrated with the processor 701.

The communication interface 704 is configured to communicate with another device or a communication network by using any transceiver-type apparatus. The communication interface 704 includes a wired communication interface, and may further include a wireless communication interface. The wired communication interface may be, for example, an Ethernet interface. The Ethernet interface may be an optical interface, an electrical interface, or a combination thereof. The wireless communication interface may be a wireless local area network (WLAN) interface, a cellular communication interface, or a combination thereof.

In specific implementation, in an embodiment, the processor 701 may include one or more CPUs, for example, a CPU 0 and a CPU 1 shown in FIG. 7.

In specific implementation, in an embodiment, the computer device may include a plurality of processors, for example, the processor 701 and a processor 705 in FIG. 7. Each of the processors may be a single-core processor (single-CPU), or may be a multi-core processor (multi-CPU). The processor herein may refer to one or more devices, circuits, and/or processing cores configured to process data (for example, computer program instructions).

In specific implementation, in an embodiment, the computer device may further include an output device 706 and an input device 707. The output device 706 communicates with the processor 701, and may display information in a plurality of manners. For example, the output device 706 may be a liquid crystal display (LCD), a light emitting diode (LED) display device, a cathode ray tube (CRT) display device, or a projector. The input device 707 communicates with the processor 701, and may receive an input of a user in a plurality of manners. For example, the input device 707 may be a mouse, a keyboard, a touchscreen device, or a sensing device.

In some embodiments, the memory 703 is configured to store program code 710 for performing the solutions of this application, and the processor 701 may execute the program code 710 stored in the memory 703. In other words, the computer device 700 may implement, by using the processor 701 and the program code 710 in the memory 703, the method provided in the embodiments in FIG. 2 to FIG. 5.

In an example embodiment, a computer-readable storage medium is further provided, for example, a memory including program code. The program code may be executed by the processor in the computer device to complete the data processing method in the foregoing embodiment. For example, the computer-readable storage medium is a non-transitory computer-readable storage medium, such as a read-only memory (ROM), a random access memory (RAM), a compact disc read-only memory (CD-ROM), a magnetic tape, a floppy disk, and an optical data storage device.

Embodiments of this application further provide a computer program product. The computer program product includes at least one piece of program code. The program code is stored in a computer-readable storage medium. A processor of a computer device reads computer instructions from the computer-readable storage medium, and executes the program code, to enable the computer device to perform the foregoing data processing method.

In addition, embodiments of this application further provide an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, so that the chip performs the data processing methods in the foregoing method embodiments.

The apparatus, device, computer-readable storage medium, computer program product, or chip provided in this embodiment is configured to perform the corresponding method provided above. Therefore, for beneficial effects that can be achieved by the apparatus, device, computer-readable storage medium, computer program product, or chip, refer to the beneficial effects in the corresponding method provided above. Details are not described herein again.

All or a part of the foregoing embodiments may be implemented by using software, hardware, firmware, or any combination thereof. When the software is used to implement the embodiments, all or a part of the foregoing embodiments may be implemented in a form of a computer program product. The computer program product includes one or more computer instructions. When the computer program instructions are loaded or executed on a computer, the procedure or functions according to embodiments of the present invention and application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive (SSD).

The foregoing descriptions are merely example embodiments of this application, but are not intended to limit this application. Any modification, equivalent replacement, or improvement made without departing from the spirit and principle of this application should fall within the protection scope of this application.

What is claimed is:

1. A data processing method, wherein the method is applied to a storage system in which storage and computing are decoupled, the storage system comprises a computing cluster and a storage cluster, the computing cluster includes a plurality of computing nodes, and the method comprises:

receiving, by a computing node in the plurality of computing nodes, a data processing request, wherein the data processing request indicates to process a file, and each computing node in the plurality of computing nodes has a function of selecting a gateway device and a function of accessing the storage cluster by using the selected gateway device;

determining, by the computing node, a first gateway device from a plurality of gateway devices in the storage cluster based on a target index that is obtained by performing a modulo operation on a hash value of the file and a quantity of the plurality of gateway devices; and sending, by the computing node, the data processing request to the first gateway device, wherein the first gateway device forwards the data processing request to a storage node in the storage cluster to complete the processing of the file.

2. The method according to claim 1, wherein correspondences between the plurality of gateway devices and indexes are recorded in the computing node, and each gateway device in the plurality of gateway devices corresponds to one index, and wherein the determining a first gateway device from a plurality of gateway devices in the storage cluster comprises:

performing hash calculation on an identifier of the file carried in the data processing request, to obtain the hash value of the file;

obtaining the target index based on the hash value and the quantity of the plurality of gateway devices; and determining, based on the correspondences between the plurality of gateway devices and the indexes, a gateway device that is in the plurality of gateway devices and that corresponds to the target index as the first gateway device.

3. The method according to claim 2, wherein the correspondences between the plurality of gateway devices and the indexes comprise an identifier of each gateway device in the plurality of gateway devices and an index corresponding to each gateway device in the plurality of gateway devices, and the identifier of each gateway device comprises an internet protocol (IP) address of each gateway device.

4. The method according to claim 2, wherein the target index is a remainder of the hash value and a quantity of the plurality of gateway devices.

5. The method according to claim 2, further comprising:

storing a gateway mapping table, wherein the correspondences between the plurality of gateway devices and the indexes are recorded in the gateway mapping table.

6. The method according to claim 1, wherein before the determining a first gateway device from a plurality of gateway devices in the storage cluster, the method further comprises:

obtaining, from a monitoring node in the storage cluster, a status of each gateway device in the storage cluster, wherein the status comprises any one of an idle state, a busy state, or a faulty state; and determining, based on the status of each gateway device in the storage cluster, the plurality of gateway devices in the idle state.

7. The method according to claim 1, wherein the sending comprises:

in response to the first gateway device being in a busy state or a faulty state, determining, based on recorded statuses of the plurality of gateway devices, a second gateway device from the plurality of gateway devices, wherein the second gateway device is any one gateway device that is in the plurality of gateway devices and that is in an idle state; and sending the data processing request to the second gateway device, wherein the second gateway device forwards the data processing request to the storage node in the storage cluster to complete the processing of the file.

8. A computer device, comprising:

at least one processor;

one or more memories coupled to the at least one processor and storing programming instructions for execution by the at least one processor to perform operations comprising:

receiving a data processing request, wherein the data processing request indicates to process a file, the computer device is one of a plurality of computing nodes in a computing cluster, and each computing node in the plurality of computing nodes has a function of selecting a gateway device and a function of accessing a storage cluster by using the selected gateway device;

determining a first gateway device from a plurality of gateway devices in the storage cluster based on a target index that is obtained by performing a modulo operation on a hash value of the file and a quantity of the plurality of gateway devices; and sending the data processing request to the first gateway device, wherein the first gateway device forwards the data processing request to a storage node in the storage cluster to complete the processing of the file.

9. The computer device according to claim 8, wherein correspondences between the plurality of gateway devices and indexes are recorded in a computing node, and each gateway device in the plurality of gateway devices corresponds to one index, and wherein the determining a first gateway device from the plurality of gateway devices in the storage cluster comprises:

performing hash calculation on an identifier of the file carried in the data processing request, to obtain the hash value of the file;

obtaining the target index based on the hash value and the quantity of the plurality of gateway devices; and determining, based on the correspondences between the plurality of gateway devices and the indexes, a gateway device that is in the plurality of gateway devices and that corresponds to the target index as the first gateway device.

10. The computer device according to claim 9, wherein the correspondences between the plurality of gateway devices and the indexes comprise an identifier of each gateway device in the plurality of gateway devices and an index corresponding to each gateway device in the plurality of gateway devices, and the identifier of each gateway device comprises an internet protocol (IP) address of each gateway device.

11. The computer device according to claim 9, wherein the target index is a remainder of the hash value and a quantity of the plurality of gateway devices.

12. The computer device according to claim 9, wherein the operations further comprise:

storing a gateway mapping table, wherein the correspondences between the plurality of gateway devices and the indexes are recorded in the gateway mapping table.

13. The computer device according to claim 8, wherein before the determining a first gateway device from a plurality of gateway devices in the storage cluster, the operations comprise:

obtaining, from a monitoring node in the storage cluster, a status of each gateway device in the storage cluster, wherein the status comprises any one of an idle state, a busy state, or a faulty state; and determining, based on the status of each gateway device in the storage cluster, the plurality of gateway devices in the idle state.

14. The computer device according to claim 8, wherein the sending the data processing request to the first gateway device comprises:

in response to the first gateway device being in a busy state or a faulty state, determining, based on recorded statuses of the plurality of gateway devices, a second gateway device from the plurality of gateway devices, wherein the second gateway device is any one gateway device that is in the plurality of gateway devices and that is in an idle state; and sending the data processing request to the second gateway device, wherein the second gateway device forwards the data processing request to the storage node in the storage cluster to complete the processing of the file.

15. A non-transitory computer-readable storage medium, wherein the non-transitory computer-readable storage medium stores at least one piece of program code, and the at least one piece of program code is read by one or more processor, to enable a computer device to:

receive a data processing request, wherein the data processing request indicates to process a file, the computer device is one of a plurality of computing nodes in a computing cluster, and each computing node in the plurality of computing nodes has a function of selecting a gateway device and a function of accessing a storage cluster by using the selected gateway device;

determine a first gateway device from a plurality of gateway devices in the storage cluster based on a target index that is obtained by performing a modulo operation on a hash value of the file and a quantity of the plurality of gateway devices; and send the data processing request to the first gateway device, wherein the first gateway device forwards the data processing request to a storage node in the storage cluster to complete the processing of the file.

16. The non-transitory computer-readable storage medium according to claim 15, wherein correspondences between the plurality of gateway devices and indexes are recorded in a computing node, and each gateway device in the plurality of gateway devices corresponds to one index, and determining the first gateway device from the plurality of gateway devices in the storage cluster comprises:

performing hash calculation on an identifier of the file carried in the data processing request, to obtain the hash value of the file;

obtaining the target index based on the hash value and the quantity of the plurality of gateway devices; and determining, based on the correspondences between the plurality of gateway devices and the indexes, a gateway device that is in the plurality of gateway devices and that corresponds to the target index as the first gateway device.

17. The non-transitory computer-readable storage medium according to claim 16, wherein the correspondences between the plurality of gateway devices and the indexes comprise an identifier of each gateway device in the plurality of gateway devices and an index corresponding to each gateway device in the plurality of gateway devices, and the identifier of each gateway device comprises an internet protocol (IP) address of each gateway device.

18. The non-transitory computer-readable storage medium according to claim 16, wherein the target index is a remainder of the hash value and a quantity of the plurality of gateway devices.

19. The non-transitory computer-readable storage medium according to claim 16, wherein the at least one piece of program code further comprises program code to:

store a gateway mapping table, wherein the correspondences between the plurality of gateway devices and the indexes are recorded in the gateway mapping table.

20. The non-transitory computer-readable storage medium according to claim 15, wherein before the determining a first gateway device from a plurality of gateway devices in the storage cluster, the at least one piece of program code further comprises program code to:

obtain, from a monitoring node in the storage cluster, a status of each gateway device in the storage cluster, wherein the status comprises any one of an idle state, a busy state, or a faulty state; and determine, based on the status of each gateway device in the storage cluster, the plurality of gateway devices in the idle state.

* * * * *